United States Patent [19]

Robeson et al.

[11] Patent Number: 5,380,403
[45] Date of Patent: Jan. 10, 1995

[54] AMINE FUNCTIONAL POLY(VINYL ALCOHOL) FOR IMPROVING PROPERTIES OF RECYCLED PAPER

[75] Inventors: Lloyd M. Robeson, Macungie, Pa.; Timothy L. Pickering, Radford, Va.

[73] Assignee: Air Products and Chemicals, Inc., Allentown, Pa.

[21] Appl. No.: 35,028

[22] Filed: Mar. 22, 1993

[51] Int. Cl.6 .............................. D21H 11/14
[52] U.S. Cl. .................. 162/147; 162/168.2; 162/189
[58] Field of Search ............ 162/147, 168.2, 164.6, 162/189

[56] References Cited

U.S. PATENT DOCUMENTS

| | | | |
|---|---|---|---|
| 3,515,288 | 10/1970 | Lipowski | 260/78 |
| 3,597,314 | 8/1971 | Laube et al. | 162/168 |
| 3,715,336 | 2/1973 | Nowak et al. | 260/77.5 |
| 4,311,805 | 1/1982 | Moritani et al. | 525/60 |
| 4,421,602 | 12/1983 | Brunnmueller et al. | 162/168.2 |
| 4,614,762 | 9/1986 | Marans et al. | 525/61 |
| 4,772,359 | 9/1988 | Linhart et al. | 162/163 |
| 4,808,683 | 2/1989 | Itagaki et al. | 526/307.2 |
| 4,880,497 | 11/1989 | Pfohl et al. | 162/135 |
| 4,978,427 | 12/1990 | Pfohl et al. | 162/168.2 |
| 5,098,521 | 3/1992 | Freudenberg et al. | 162/168.2 |

FOREIGN PATENT DOCUMENTS

| | | |
|---|---|---|
| 0251182 | 1/1988 | European Pat. Off. . |
| 0331047 | 4/1989 | European Pat. Off. . |
| 0337310 | 10/1989 | European Pat. Off. . |

OTHER PUBLICATIONS

B. A. Thorp, ed., "Pulp and Paper Manufacture", vol. 7, Paper Machine Operations, Tappi, Atlanta, 1991 (Third edition).

W. H. Siewert, "The use of wastepaper in tissue production," Jan. 1989 Tappi Journal, p. 41.

E. Uutela et al, "Recycled fiber use expected to grow by 41% and reach 130 million tons yearly by 2001," Jul. 1990, Tappi Journal, p. 50.

W. F. Carr, "New trends in deinking technology" Feb. 1991 Tappi Journal, p. 127.

J. S. Michelman, et al, "Repulpability of coated corrugated paperboard", Oct. 1991 Tappi Journal, p. 79.

H. H. Espy, et al, "Using neutral/alkaline-curing resins to produce wet-strength grades from recycled pulp," Jul. 1992 Tappi Journal, p. 192.

B. J. Hipple, "Fine paper properties and the effects of wet-end starch when using deinked recycled fiber in an alkaline system," May 1991 Tappi Journal, p. 79.

G. G. Spence, "Encyclopedia of Polymer Science and Engineering, vol. 10, Molecular Weight Determination to Pentadiene Polymers", A Wiley-Interscience Publication, p. 761, 2nd. Ed.

*Primary Examiner*—Peter Chin
*Attorney, Agent, or Firm*—Mark L. Rodgers

[57] ABSTRACT

The addition of an amine functional poly(vinyl alcohol) in a process for making recycled paper products results in improvements in both the wet and dry strength of the resultant products. The amine functional poly(vinyl alcohol) used in the process is formed by the hydrolysis of vinyl acetate/vinyl amide copolymers or vinyl acetate/allyl amine copolymers, or optionally may be formed by the reaction of poly(vinyl alcohol ) with an amino-aldehyde dialkyl acetal.

3 Claims, No Drawings

AMINE FUNCTIONAL POLY(VINYL ALCOHOL) FOR IMPROVING PROPERTIES OF RECYCLED PAPER

FIELD OF THE INVENTION

This invention relates to a method of improving the properties of recycled cellulosic based paper products. In particular, this method yields improved dry strength and wet strength of various recycled paper sources without sacrificing repulpability.

BACKGROUND OF THE INVENTION

Cellulosic pulp based products comprise one of the largest and most important commodity articles of commerce. The technology for cellulosic pulp based paper products is well developed for virgin pulp and many additives are employed to improve various properties. These properties include wet and dry tensile strength, wet and dry tear strength, wet and dry burst strength, oil resistance, fold resistance, stain resistance, printability and the like. The use of recycled paper based materials is a large emerging application area of considerable importance to the pulp and paper industry. The utility of recycled pulp based products include both 100% recycled products as well as in admixture with virgin pulp.

Both areas will generally require additives to upgrade the physical properties of the resultant paper, cardboard or tissue (e.g. dry strength, wet strength, burst strength, tear resistance) as the recycled paper will show diminished properties in these categories. In some cases, the loss in physical properties could be counterbalanced by utility of more recycled pulp (higher basis weight). However, the added weight is not desired in cases where light weight products are required or where increased shipping weight would not be economically acceptable. In many cases, the standards for container packaging require certain physical property conditions which have been established for virgin pulp based products and cannot be readily achieved with 100% recycle or recycle/virgin combinations. Polymeric additives (e.g. cationic starch, cationic poly acrylamides) are often added to improve dry strength, however, offer only limited applicability to wet strength.

Wet strength additives (e.g. poly(amido amine/epichlorohydrin) require a thermal treatment or long aging at ambient conditions to generate wet strength via crosslinking reactions. Once crosslinking has occurred, the paper product cannot be easily repulped unless special treatments are conducted to break-up the chemical crosslinks. Another common wet strength additive is a formaldehyde based polymer (urea-formaldehyde and melamine formaldehyde resins). These polymers not only have repulpability problems but another environmental concern, namely, formaldehyde emissions. These polymers have recently fallen out of favor because of formaldehyde emissions and are being rapidly replaced. An additive offering both wet and dry strength improvements combined with the ability to be recycled is desired in pulp/paper recycled materials to bring performance standards up to that typically observed with virgin pulp. In essence, an additive which improves the properties of recycled paper but which renders the product non-recyclable is not desired as many recycled paper products may be also recycled.

Additives to paper to improve the property balance are characterized by the point of addition in the papermaking process. Generally, the point of addition is referenced to as wet-end or dry-end addition. Wet-end addition involves addition of the additive(s) to the pulp slurry prior to paper (or cardboard or tissue) production. Dry-end addition refers to addition of the additive(s) to the paper (cardboard or tissue) after paper formation and drying via saturation sizing or surface sizing techniques well known in the industry. The paper making process (both wet-end and dry-end addition) has been discussed in many detailed publications. One such reference is "Pulp and Paper Manufacture", Vol.7, Paper Machine Operations, B. A. Thorp, ed., TAPPI, Atlanta, 1991 (3rd edition).

Recycled paper products are significantly different than virgin pulp. One major difference is the additives which are prevalent in the recycled products are obviously not present in virgin pulp. The additives to virgin pulp can be controlled, however, this is not possible with recycled paper. These additives include not only the wet and dry strength additives noted supra but also retention aids to retain fines and fillers, alum, drainage aids, pitch or stickies control additives, fillers, inks, defoamers, and the like. The presence of these additives can result in major differences in the efficiency or applicability of additional additives to recycled paper. The problems of recycled paper is of major concern to the paper industry and has been noted in countless industry studies and publications, several of which will be cited herein. Siewert (TAPPI J., p.41, Jan. 1989) discusses the use of wastepaper in tissue production and discusses the problems with contaminants (lacquers, surface print, colored paper, and stickies). Uutela and Black (TAPPI J., p.71, Jan. 1990) reviews the use and expected future use of recycled paper and discusses some of the general problems associated with recycled paper. The problems with ink contamination was addressed by Carr (TAPPI J., p.127, Feb. 1991). The repulpability of coated corrugated cardboard was discussed by Michelman and Capella (TAPPI J., p.79, Oct. 1991). They noted that waxes, pigments, hot-melt coatings used to impart specific properties to the cardboard can affect the repulpability. These "contaminants" could also influence the properties of the recycled cardboard. Epsy and Geist (TAPPI J. p.192, July 1992) note that polyamide-epichlorohydrin resins with azetidinium or quaternary ammonium epoxide functional groups can be used to produce wet strength paper from recycled pulp. They note that dry strength improvement of recycled pulps can be achieved with additives, however, little attention had been placed on the wet strength of recycled pulps.

Polyamide-epichlorohydrin resins, however, are well known to improve wet strength at the expense of repulpability. Additives which improve wet and dry strength without sacrificing repulpability, however, are desired. Hipple (TAPPI J., p.79, May 1991) notes that secondary fiber has different characteristics than the virgin pulp on which it was based. The deinking process introduces major changes in the fiber characteristics requiring differences in the type of polymeric additives utilized in the wet-end operation. It was noted that with cationic wet-end starch the level of cationic substitution may need to be adjusted to yield the desired properties. These papers note the problems of recycled paper, the problems of contamination, and the differences encountered versus virgin pulp. The high level of anionic "trash" in newsprint, as an example, questions the utility of cationic polymers in achieving the desired property improvements due to polyelectrolyte complexation.

U.S. Pat. Nos. 4,880,497 and 4,978,427 discuss the use of amine functional polymers for use in improving the dry and wet strength of paper. These amine functional polymers are based on copolymers comprising 10 to 95 mole % N-vinyl formamide which are hydrolyzed to yield amine functionality. The copolymers also contain an ethylenically unsaturated monomer including vinyl esters (such as vinyl acetate), alkyl vinyl ethers, N-vinyl pyrrolidone, and the esters, nitriles, and amides of acrylic acid or methacrylic acid. Thus, amine functional poly(vinyl alcohols) are included as they would result from the hydrolysis of vinyl acetate/N-vinyl formamide copolymers. The problems of copolymerization to yield uniform copolymers of vinyl acetate/N-vinyl formamide above 10 mole % NVF are not noted and, indeed, the examples shown in these patents clearly do not represent random copolymers but most probably polymer mixtures of various compositions between poly(vinyl acetate) and poly(N-vinyl formamide) (before hydrolysis). Although these patents note the use in waste paper, they do not show any specific examples or note the more demanding characterization required for recycled paper. More importantly, these patents do not demonstrate that low levels of amine functionality (<10 mole %) in poly(vinyl alcohol) would be effective; and based on the claims and examples it would be unexpected that lower levels would be effective for virgin pulp. With the more severe problems with recycled paper; utility of amine functionality of less than 10 mole % would even be less expected.

European Patent Application 0 251 182 discusses a vinyl amine copolymer derived from hydrolyzed co- or terpolymers of N-vinyl formamide, (meth)acrylonitrile, (meth)acrylamide, and acrylic acid. Utility as a drainage aid in papermaking and as a paper strength additive was noted. European Patent Application 331,047 notes the utility of a high molecular weight poly(vinyl amine) as a wet-end additive in paper making for improved dry strength and fiber retention aid. European Patent Application 337,310 discusses vinyl alcohol-vinylamine copolymers in combination with an anionic polymer which increases the moist compressive strength of paper and paperboard. The specific utility of improving the wet and dry strength of recycled paper was not investigated or noted.

U.S. Pat. No. 4,772,359 notes the utility of high molecular weight water soluble poly(N-vinylamides) as drainage aids, retention aids and flocculants for paper, board and cardboard applications. U.S. Pat. No. 3,597,314 discusses a method of improving the drainage of cellulose fiber suspension with polymers of N-vinyl-N-methyl formamide. U.S. Pat. No. 3,715,336 discusses vinyl alcohol/vinylamine copolymers prepared by the hydrolysis of vinyl acetate/vinyl carbamate copolymers for utility as flocculants for aqueous suspension of inorganic solids. U.S. Pat. No. 4,311,805 discusses vinyl alcohol copolymers containing specific cationic groups for use as paper strength addition.

U.S. Pat. No. 4,421,602 notes the utility of vinylamine/N-vinyl formamide copolymers for use as retention agents, drainage aids and flocculants for use in papermaking. U.S. Pat. No. 4,614,762 discusses a water soluble product of polyethyleneimine reacted with formaldehyde and poly (vinyl alcohol). The product is noted to be useful as an improved drainage and retention aid in papermaking. U.S. Pat. 4,808,683 discloses vinylamine copolymers which offer utility as flocculating agents, drainage aids, and paper strength additives. U.S. Pat. No. 3,535,288 discusses cationic poly(amide-epichlorohydrin) thermosetting resins for use in the production of paper having improved wet strength.

A comprehensive review of polymeric additives incorporated in paper manufacture is given by G. G. Spence in Encyclopedia of Polymer Science and Engineering, 2nd Ed., Wiley-Interscience, Vol. 10, p. 761–786, New York, 1987. This review discusses in detail the various additives commonly incorporated in virgin pulp for various paper based products, however, does not review the relevance of these additives for recycled paper.

SUMMARY OF THE INVENTION

It has been found that the addition of amine functional poly(vinyl alcohol) at the wet-end of a papermaking process leads to desired property improvements in recycled paper. The amine functional poly(vinyl alcohols) which are useful in this invention include the hydrolysis product of vinyl acetate/vinyl amide copolymers or vinyl acetate/allyl amine copolymers where the vinyl amide or allyl amine level is >1 mole % and <10 mole % and the hydrolysis of vinyl acetate is >75% and the hydrolysis of the vinyl amide is >25%. Additionally, the poly(vinyl alcohol) can be the reaction product of poly(vinyl alcohol) and an amino-aldehyde dialkyl acetal where the amine content is from >1 mole % to <15 mole % based on vinyl alcohol units. The property improvements noted are wet and dry strength improvements combined with repulpability. These additives result in improvements in both 100% recycled as well as recycled paper/virgin pulp combinations.

DETAILED DESCRIPTION OF THE INVENTION

We have found that the addition of amine functional poly(vinyl alcohol) offers the desired improvements in recycled paper at low levels of amine functionality. The preferred amine functional poly(vinyl alcohol) is obtained by copolymerization of vinyl acetate with N-vinyl formamide, N-vinyl acetamide, or allyl amine, followed by hydrolysis of the vinyl acetate and amide containing monomers. The incorporation of the N-vinyl formamide, N-vinyl acetamide, or allyl amine of up to 10 mole % in the vinyl acetate copolymer is contemplated in this invention. Another route contemplated in this invention involves the reaction of poly(vinyl alcohol) with aminoaldehyde (e.g. 4-aminobutyraldehyde dimethyl acetal). The level of a blocked aminoaldehyde incorporation in poly(vinyl alcohol) from 1 to 15 mole % based on vinyl alcohol repeat units is contemplated in this invention. The addition of the amine functional poly(vinyl alcohols) to recycled pulp or recycled pulp/virgin pulp mixtures is 0.1 to 4.0 wt. % based on dry paper weight. The preferred range of addition is 0.2 to 2.0 wt. %.

Polyvinyl(alcohol) is not effective as a wet strength additive of as an additive in the wet-end of the paper process because it is not substantive to paper and is removed in the presence of water. Surprisingly, low levels of amine functionality, preferably about 1 to 10 mole percent based on vinylamine or allylamine units, show substantive characteristics with retention upon immersion in water, leading to improved physical properties under both wet-end and dry-end addition to paper. At higher levels of amine functionality in poly(vinyl alcohol), the economics are less favorable for this very cost sensitive market, the performance is surprisingly not improved over 10 mole % vinylamine incorporation as would be expected from the teachings of U.S. Pat. Nos. 4,880,497 and 4,978,427, and the problem with obtaining random copolymers above 10 mole % of the vinyl amide in the precursor vinylacetate/N-vinylamide copolymers due to reactivity differences in batch polymerization. With allylamine incorporation, levels above 10 mole % leads to significant reductions in the achievable molecular weight. Another potential route for achieving amine functional poly(vinyl alcohols) for utility in this invention involves the reaction of specific blocked amino aldehydes such as 4-amino butyraldehyde dimethyl acetal. The incorporation of amine functionality in poly(vinyl alcohol) via this method is of interest in the range of 1% to 15% amine functionality based on vinyl alcohol repeat units. Above this level, the efficiency of modification is lower, and the economics are less favorable for the very cost sensitive recycled paper market.

The utility of the amine functional poly(vinyl alcohol) has been demonstrated to improve the properties of recycled paper. The types of recycled paper common to the paper industry includes old corrugated cardboard, office waste, old newsprint, tissue waste, old magazines, paper bags, paper utilized in packaging and the like. These sources often contain additives, inks, coatings, fillers, retention aids, adhesives and other contaminants which can render the recycled paper much different than the virgin pulp from which it was manufactured. These differences can and have been shown to affect the response of typical polymer additives to properties such as wet strength, dry strength, fold resistance, burst strength, etc. Recycled paper thus is a different base material than virgin pulp, and the polymer additives which work well with virgin pulp will not necessarily offer the same advantage with recycled paper. The amine functional poly(vinyl alcohol) has shown useful improvement for many different types of recycled paper. The use of the amine functional poly(vinyl alcohols) of this invention is also contemplated for mixtures of recycled and virgin pulp sources.

The preferred routes to amine functional poly(vinyl alcohol) include the synthesis of vinyl acetate/N-vinylamides (e.g. N-vinylformamide, N-vinyl(acetamide)) copolymers followed by the hydrolysis of vinyl acetate to vinyl alcohol units and vinylamide units to vinylamine. The synthesis of the precursor copolymer can be conducted in solution, slurry, suspension or emulsion type polymerizations. A preferred route involves polymerization in methanol which results in a "paste" like product which is amenable to hydrolysis. The hydrolysis can be conducted in several steps; the first step involves catalytic amount of base (e.g. KOH, NaOH) and results in the hydrolysis of vinyl acetate groups. Hydrolysis of the vinyl amide groups can be accomplishment by higher levels of base (or by acid addition) followed by proper time/temperature to yield the desired level of hydrolysis. The desired level of vinyl acetate conversion to vinyl alcohol is 75 to 100%, and for vinylamide conversion to vinylamine from 25 to 100%. The resultant copolymers are readily soluble in water and can be added to the wet-end of the paper making operation.

Another preferred route to amine functional poly(vinyl alcohol) involves copolymerization of vinyl acetate-/allylamine using methods similar to poly(vinyl acetate) polymerization. The hydrolysis of the vinyl acetate to vinyl alcohol 75-100%) yields a readily water soluble copolymer which can be added to the wet-end of the paper making operation. Allylamine levels of 1 to 10 mole % are desired with 2 to 8 mole % preferred.

A third preferred method involves the reaction of a poly(vinyl alcohol) (level of hydrolysis of 75 to 100%) with aminoaldehyde dialkyl acetal. Amino aldehydes would not be useful as the aldehyde and amine groups are self reactive.

The dialkyl acetal (preferred dimethyl acetal) allows for the aldehyde to be protected from amine reaction. The reaction of poly(vinyl alcohol) with the aminoaldehyde dialkyl acetal can be conducted in a water solution under acidic condition. The product can then be added to a pulp slurry in the wet-end as a water solution or could be isolated by coagulation or spray drying method, and added as a fine powder to the pulp slurry. The preferred amino aldehyde dialkyl acetal is 4-aminobutyraldehyde dimethyl acetal (ABAA). Other variants could include but not be limited to N-ethyl aminoacetaldehyde diethyl acetal and N-methyl aminoacetal dehyde dimethyl acetal, 4-aminobutyraldehyde diethyl acetal. The aminoaldehyde dialkyl acetal modification of poly(vinyl alcohol) is desired to be in the range of 1 to 15 mole % based on vinyl alcohol units, and the preferred range is 2 to 12 mole %.

Additional variants of this invention can include minor amounts (<10 mole %) of comonomers to the precursor vinyl acetate polymer or copolymer such as maleic anhydride, N-vinyl, ethylene, acrylic acid, acrylates, N-vinyl pyrrolidone cationic monomers and the like. Other modifications of the vinyl alcohol copolymers of this invention can also be envisioned such as reaction with glycidyl trimethyl ammonium chloride.

The vinyl acetate copolymers of this invention can be prepared by methods well known for poly(vinyl acetate) including emulsion, suspension, solution or bulk polymerization techniques. Rodriguez, in "Principles of Polymer Systems", p. 98–101,403, 405 (McGraw-Hill, NY, 1970) describes bulk and solution polymerization and the specifics of emulsion polymerization. When preparing poly(vinyl acetate) by suspension polymerization, the monomer is typically dispersed in water containing a suspending agent such as poly(vinyl alcohol) and then an initiator such as peroxide is added. The unreacted monomer is devolatilized after polymerization is completed, and the polymer is filtered and dried. Poly(vinyl acetate) can be prepared via solution polymerization wherein the vinyl acetate is dissolved in a solvent (such as acetone) in the presence of an initiator for polymerization. After completion of the polymerization, the polymer is recovered by coagulation of or by solvent devolatilization.

Poly(vinyl alcohol) is prepared from the hydrolysis of poly(vinyl acetate). The hydrolysis of poly(vinyl alcohol) is well-known to those skilled in the art and is described in detail in the book "Poly(vinyl alcohol): Properties and Applications", ed. by C. A. Finch, John Wiley & Sons, New York, 1973 and "Poly(vinyl alcohol) Fibers" ed. by I. Sokuruda, Marcel Dekker, Inc., New York, 1985. A recent review of poly(vinyl alcohol) was given by F. L. Marten in the Encyclopedia of Polymer Science and Engineering, 2nd ed., Vol. 17, p. 167, John Wiley & Sons, New York, 1989.

The hydrolysis of the vinyl acetate polymers or copolymers of this invention can be accomplished using methods typically utilized for poly(vinyl alcohol) as noted in the references supra. Either acid or base hydrolysis or combinations thereof can be conducted to yield the amine functional poly(vinyl alcohols) of this invention. In the case of acid hydrolysis, the amine group is protonated to yield a positive charge neutralized with an anionic group (e.g. $Cl^-$, $Br^-$, $HSO_4^-$, $H_2PO_4^-$, and the like). Both the amine ($-NH_2$) or protonated versions ($NH_3^+X^-$) are suitable in this invention.

Additives commonly incorporated in paper can be used in admixture with the amine functional poly(vinyl alcohols) of this invention. These include but are not limited to cellulose reactives sizes (alkyl ketene dimer, alkenyl succinic anhydride), alum, anionic starch, cationic starch, carboxymethyl cellulose, fillers ($CaCO_3$), retention and drainage acids (poly(ethyleneamine), as well as additional wet and dry strength additives.

The experimental data illustrate that the amine functional poly(vinyl alcohols) offer significant improvements in the wet strength of recycled paper when incorporated in the wet-end. Additional improvements in dry strength are also observed. This is unexpected in view of U.S. Pat. Nos. 4,880,497 and 4,978,427 which teach that N-vinyl formamide levels of >10 mole % (with preferred ranges and experimental examples at such higher levels) are desired. In fact, it has been surprisingly found that the preferred levels are at <10 mole % vinylamide (including N-vinylformamide) incorporation in the precursor polymer.

EXPERIMENTAL

The following examples are presented to better illustrate the present invention and are not meant to be limiting.

Sample Preparation

The protocol for preparation of laboratory handsheets was based on a procedure derived from TAPPI 205. Sufficient moist pulp to contain 24 g of pulp on a dry basis was soaked in about 1800 ml of tap water for at least three hours. The slurry was then transferred to a British Standard pulp disintegrator, any wet end additives (such as alum, anionic starch, and amine functional poly(vinyl alcohol) to be utilized were added; the final volume was made up to 2000 ml and the mixture was stirred for 50,000 revolutions. After mixing, the contents were transferred to a 10 liter plastic bucket and diluted to a final volume of 7.2 liters (approximately 0.33% consistency: see procedure noted next). The pH was adjusted to the desired value using 0.1M sulfuric acid or 0.1M sodium hydroxide. The slurry was stirred for 30 minutes at low speed using a laboratory mixer.

Twelve to sixteen 400 ml aliquots were dipped from the bucket and transferred to 600 ml beakers. Pulp slurries are difficult to pour while at the same time maintaining a uniform fiber concentration. The following technique was found useful for obtaining aliquots with fairly uniform fiber concentration. The pulp slurry was stirred with a large spatula, a 400 ml beaker was immersed below the surface and stirring was stopped. The beaker was withdrawn directly from the bucket, full to the brim, and the entire contents transferred to the 600 ml beaker. The British Standard handsheet machine was used to make handsheets from each beaker of slurry as described in Tappi Method 205. After pressing as described, the sheets were conditioned overnight in a constant temperature/humidity chamber operated at 23° C. and 50% R.H. The handsheets were removed from the mirror surface drying plates, allowed to equilibrate for 15-30 minutes at R.T., weighed and stored in polyethylene ziplock bags until testing.

Testing of Laboratory Handsheets

The basic evaluation method used in these experiments was the tensile breaking strength of paper strips as measured using an Instron machine (see TAPPI Method 495). Ten 0.5 inch wide strips were cut from the set of handsheets being evaluated using a paper strip cutter designed for this purpose. Five strips from each set were tested in dry mode to determine the tensile strength in units of lbs/in of width. The other five strips were soaked in tap water for 30 minutes, lightly blotted with a paper towel and then immediately tested using the same procedure thus yielding the wet tensile strength. Independent tests showed 30 minutes soaking time was sufficient to completely saturate the paper.

Determination of Pulp Consistency

The procedure utilized for the determination of pulp consistency was similar to TAPPI Method 240. Whatman #1 filter paper pads were oven dried for 15 minutes at 105° C., equilibrated for 5 minutes at R.T. and weighed to determine dry basis weight. About 2 grams of moist pulp was accurately weighed into a 600 ml beaker and slurried with 300 ml of water. The slurry was transferred to a small Waring blender and stirred for 30 sec on low speed. The dispersed slurry was filtered using one of the pre-weighed filter papers and the moist pad was dried for 15 minutes at 105° C. on a Emerson speed dryer. The dried pad was equilibrated for 5 minutes at R.T. and weighed. The amount of dry pulp in the original sample was thus determined.

For each new container or pulp sample to be used for handsheet preparation, three samples were taken from various locations in the sample and the consistency was determined as described above. The average consistency so determined was used in all subsequent handsheet preparations using that material.

Synthesis of PVOH/VAm·HCl)—Polymer A

The poly(vinyl alcohol/vinyl amine) copolymer (6 mole % vinyl amine) was prepared by first polymerizing a vinyl acetate/N-vinyl acetamide (94/6 molar) copolymer in methanol by free radical polymerization procedures. The vinyl acetate/N-vinyl acetamide copolymer was hydrolyzed to a vinyl alcohol/N-vinyl acetamide copolymer by the alkali saponification of vinyl acetate using 0.1 molar Na methoxide in the methanol solution. The vinyl alcohol/N-vinyl acetamide copolymer was hydrolyzed to a vinyl alcohol/vinyl amine-HCl copolymer by heating at 90° C. in distilled water to which concentrated HCl was added (for 6 hours). The product was precipitated using methanol and then dried in a vacuum oven.

PVOH/ABAA (12 mole % amine) Synthesis Procedure—Polymer B

Poly(vinyl alcohol) (Airvol 350, 30 gr., 0.68/mole) was dissolved in water (270 ml) at 70° C. under $N_2$. After dissolution, concentrated hydrochloric acid (16.34 g, 0.170 mole) and 4-aminobutyraldehyde dimethyl acetal (ABAA) (18.14 g, 0.136 mole) were added to the reaction along with additional water (20 ml). The reaction was continued at 75° C. for 6 hours and cooled to room temperature. The polymer product was isolated by precipitation in acetone, washed with further acetone and dried in a vacuum oven (60° C./1 torr) to give 36.52 gr. of product. The composition of the resultant polymer as determined by $^{13}C$ NMR was 12% mole % ABAA incorporation.

Synthesis of PVOH/VAm·HCl (3 mole % VAm—HCl)·Polymer C

The poy(vinyl alcohol/vinyl amine) copolymer (3 mole % vinyl amine was prepared by first polymerizing a vinyl acetate/N-vinyl formamide (97/3 molar) copolymer in methanol by free radical conditions. The vinyl acetate/N-vinyl formamide copolymer was hydrolyzed under base catalyzed conditions of 0.02 eq. mole KOH per vinyl acetate. The hydrolysis was conducted at 60° C. for 1½ hours. The polymer precipitated as a fine powder. The product was slurried in methanol and an excess of HCl based on amide (3 eq. of HCl per amide unit) was added to complete the hydrolysis to the vinylamine (20 hours at 60° C.). The white slurry was filtered, washed with fresh methanol and then dried.

Synthesis of PVOH/ABAA (5 mole % ABAA)—Polymer D 137 grams of Airvol 540 poly(vinyl alcohol) was slurried in 120 gr. of methanol for 15 min. 23 grams of 4-amino butyraldehyde dimethyl acetal was added followed by addition of 23 grams glycidyl trimethyl ammonium chloride. The resultant product is an amine functional poly(vinyl alcohol) with permanent cationic functionality. The ABAA content was found to be 5 mole % based on vinyl alcohol units.

Synthesis of PVOH/VAm·HCl (12 mole % VAm·HCl)—Polymer E

The poly(vinyl alcohol/vinyl amine) copolymer (12 mole % vinyl amine was prepared by first polymerizing a vinyl acetate/N-vinyl formamide (88/12 molar ratio) copolymer in methanol by free radical conditions. The vinyl acetate/N-vinyl formamide copolymer was hydrolyzed under base catalyzed conditions of 0.01 eq. mole KOH per vinyl acetate units in the presence of methanol. The reaction product was placed in a plastic bag and placed in a water bath at 60° C. for 15 min. The resultant material was dried in a vacuum oven at 60° C. overnight to yield a powder. The powder was then dissolved in water with 1.5 eq. KOH based on vinyl amide units and stirred at 80° C. for 8 hours. The product (solution) was cooled and concentrated HCl was added to pH<1. The polymer was then precipitated in methanol and dried.

EXAMPLES 1 TO 3

Unbleached kraft old corrugated container (OCC) recycled pulp was obtained from Scott Paper Co. Alum and anionic starch were added at the level of 1% and 0.3% based on dry OCC pulp. Three samples of handsheets were prepared using the procedure noted previously. Example #1 was the control sample. Example #2 involved addition of 0.5 wt. % of the PVOH/ABAA (12 mole % ABAA) (Polymer B) based on dry pulp. Example 3 involved addition of 0.5 wt. % of the PVOH/VAm·HCl (6 mole % VAm·HCl) (Polymer A). The property data on the handsheets prepared from these samples are listed in Table 1.

The amine functional poly(vinyl alcohols) show significant improvement in the wet and dry strength of recycled corrugated cardboard. (See Dry Tensile Index and Wet Tensile Index values).

EXAMPLES 4-6

Office waste pulp was obtained from Marcal Corp. Alum and anionic starch were added at a level of 1% and 0.3% by weight respectively based on dry pulp. Three different samples of handsheets were prepared according to the protocol noted earlier. Example #4 was the control sample. Example #5 involved addition of 0.5 wt. % of the PVOH/ABAA (12 mole % ABAA) (Polymer B) based on dry pulp. Example 6 involved addition of 0.5 wt. % of the PVOH/VAm·HCl (6 mole % VAm·HCl) (Polymer A) based on dry pulp. The property data on the handsheets prepared from these samples are listed in Table 1.

Again, the amine functional polymers show significant improvements in wet strength with modest improvement in dry strength (compare Dry Tensile Index and Wet Tensile Index values).

TABLE 1

| Test | Handsheet Data - Recycled Pulps (Alum + Anionic Starch Added)* | | | | | |
|---|---|---|---|---|---|---|
| | 1 | 2 | 3 | 4 | 5 | 6 |
| Grammage, g/m² | 135.9 | 138.4 | 142.6 | 142.2 | 133.7 | 136.5 |
| Basis Wt., lb/ft² | 27.8 | 28.3 | 29.2 | 29.1 | 27.4 | 28.0 |
| Dry Tensile, lb/in | 20.5 | 38.6 | 27.8 | 26.8 | 29.6 | 29.5 |
| Dry Tensile, kN/m | 3.6 | 6.8 | 4.9 | 4.7 | 5.2 | 5.2 |
| Wet Tensile, lb/in | 0.5 | 3.5 | 2.8 | 0.7 | 3.3 | 2.1 |
| Wet Tensile, kN/m | 0.1 | 0.6 | 0.5 | 0.1 | 0.6 | 0.4 |
| Tens. Index, Nm/g+ | 26.4 | 48.8 | 34.1 | 33.0 | 38.8 | 37.8 |
| Wet TI, Nm/g‡ | 0.6 | 4.4 | 3.4 | 0.9 | 4.3 | 2.7 |
| Wet/Dry, % | 2.4% | 9.1% | 10.1% | 2.6% | 11.1% | 7.1% |
| Breaking Len, m | 2641 | 4885 | 3415 | 3300 | 3877 | 3781 |
| Recycled Paper | OCC | OCC | OCC | OWP | OWP | OWP |
| Polymer Additive | None | B | A | None | B | A |

*1.0% Alum + 0.3% starch added to all examples.
+ Dry Tensile Index
‡ Wet Tensile Index

EXAMPLES 7 TO 9

Old newsprint (ONP) was obtained from FSC Corp. for evaluation. Alum and anionic starch were added at the 1% and 0.3% (by wt) respectively based on dry pulp. Three samples of handsheets were prepared using the procedure previously noted. Example #7 was the control sample. Example #8 involved addition of 0.5 wt. % of the PVOH/ABAA (12 mole % ABAA) (Polymer B) based on dry pulp. Example #9 involved addition of 0.5 wt. % of the PVOH/VAm·HCl (6 mole % VAm·HCl) (Polymer A). The property data on the handsheets prepared from these samples are listed in Table 2.

The amine functional polymers show significant improvements in wet strength with modest improvements in dry strength (compare Dry Tensile Index and Wet Tensile Index values).

EXAMPLES 10 TO 12

Tissue was obtained from FSC Corp. Alum and anionic starch was added at the level of 1% and 0.3% based on dry weight of the tissue waste. Three samples of handsheets were prepared using the procedure noted previously. Example #10 was the control sample for this series. Example #11 involved addition of 0.5 wt. % of the PVOH/ABAA (12 mole % ABAA) (Polymer B) based on dry pulp. Example #12 involved addition of 0.5 wt. % of the PVOH/VAm·HCl (6 mole % VAm·HCl) (Polymer A) based on dry pulp. The property data on the handsheets prepared from these samples are listed in Table 2.

The amine functional polymers show significant improvements in wet strength with modest improvements in dry strength (compare Dry Tensile Index and Wet Tensile Index).

TABLE 2

Handsheet Data - Recycled Pulps (Alum + Anionic Starch Added)*

| Test | 7 | 8 | 9 | 10 | 11 | 12 |
|---|---|---|---|---|---|---|
| Grammage, g/m$^2$ | 138.0 | 129.4 | 135.8 | 145.5 | 144.2 | 142.9 |
| Basis Wt., lb/ft$^2$ | 28.3 | 26.5 | 27.8 | 29.8 | 29.5 | 29.3 |
| Dry Tensile, lb/in | 23.2 | 25.5 | 26.8 | 30.2 | 32.2 | 33.8 |
| Dry Tensile, kN/m | 4.1 | 4.5 | 4.7 | 5.3 | 5.6 | 5.9 |
| Wet Tensile, lb/in | 0.6 | 2.9 | 3.5 | 0.7 | 4.1 | 2.5 |
| Wet Tensile, kN/m | 0.1 | 0.5 | 0.6 | 0.1 | 0.7 | 0.4 |
| Tens. Index, Nm/g+ | 29.4 | 34.5 | 34.5 | 36.3 | 39.1 | 41.4 |
| Wet TI, Nm/g‡ | 0.8 | 3.9 | 4.5 | 0.8 | 5.0 | 3.1 |
| Wet/Dry, % | 2.6% | 11.4% | 13.1% | 2.3% | 12.7% | 7.4% |
| Breaking Len, m | 2944 | 3451 | 3455 | 3634 | 3911 | 4140 |
| Recycled Paper | ONP | ONP | ONP | Tissue Waste | Tissue Waste | Tissue Waste |
| Polymer Additive | None | B | A | None | B | A |

*1.0% Alum + 0.3% starch added to all examples.
+ Dry Tensile Index
‡ Wet Tensile Index The relative improvements in wet and dry strength by addition of the amine functional poly(vinyl alcohol) are listed in Table 3. Significant improvements in wet strength are observed along with modest improvements in dry strength.

TABLE 3

Percentage Improvements in Recycled Paper Properties with Amine Functional Poly(vinyl alcohol) Addition

| Recycled Paper | | OCC | OWP | ONP | Tissue Waste |
|---|---|---|---|---|---|
| % Wet Strength Improvement | Polymer A | 467% | 200% | 463% | 288% |
| | Polymer B | 633% | 378% | 388% | 525% |
| % Dry Strength Improvement | Polymer A | 29% | 15% | 17% | 14% |
| | Polymer B | 85% | 18% | 17% | 7.7% |

EXAMPLE 13

Herty virgin unbleached pine pulp #3 was soaked (111.2 grams) in 2 liter tap H$_2$O for at least 4 hours to overnight. The consistency was determined. The sample was mixed for 50,000 revolutions in the pulp disintegrator. The slurry was poured into a large bucket, diluted to 7.2 liter with tap H$_2$O. The pH was adjusted to ~5.0 using 0.1 m H$_2$SO$_4$. The slurry was mixed for 30 minutes. Handsheets were prepared using a procedure similar to TAPPI procedure. The properties of the handsheets are listed in Table 4.

EXAMPLE 14

The procedure of Example #13 was followed except 0.5% of PVOH/VAm·HCl (6 mole % VAm·HCl) (Polymer A) was added prior to the pulp disintegration stage. The test results are given in Table 4.

EXAMPLE 15

The procedure of Example 13 was followed except 50% of the Herty #3 pulp was replaced with ONP (old newsprint). The test results are given in Table 4.

EXAMPLE 16

The procedure in Example 15 was followed except 0.5% of PVOH/VAm·HCl (6 mole % VAm·HCl) (Polymer A) was added prior to the pulp disintegration stage. The test results are given in Table 4.

TABLE 4

Handsheet Date - Recycled Pulps/Virgin Pulp Mixtures

| Example | 13 | 14 | 15 | 16 |
|---|---|---|---|---|
| Grammage, g/m$^2$ | 140.3 | 139.9 | 172.0 | 156.0 |
| Basis Wt., lb/ft$^2$ | 28.7 | 28.6 | 35.2 | 32.0 |
| Dry Tensile, lb/in | 48.2 | 55.0 | 43.4 | 39.0 |
| Dry Tensile, kN/m | 8.4 | 9.6 | 7.6 | 6.8 |
| Wet Tensile, lb/in | 1.4 | 5.9 | 1.7 | 4.0 |
| Wet Tensile, kN/m | 0.2 | 1.0 | 0.3 | 0.7 |
| Dry Tensile Index, Nm/g | 60.2 | 68.9 | 44.2 | 43.8 |
| Wet Tensile Index, Nm/g | 1.7 | 7.4 | 1.7 | 4.5 |
| Wet/Dry % | 2.9% | 10.7% | 3.9% | 10.3% |
| Breaking Length m | 6016 | 6885 | 4417 | 4377 |
| Polymer Additive | None | Polymer A | None | Polymer A |
| Alum (%) | — | — | — | — |
| Starch (%) | — | — | — | — |
| Paper Stock (% recycle) | 0% | 0% | 50% | 50% |
| Polymer Add-on | — | 0.5% | 0 | 0.5% |

EXAMPLE 17

The same procedure of Example 13 was followed except 1% alum and 0.3% starch was added based on dry pulp prior to the pulp disintegrating mixing. The properties of the handsheets are listed in Table 5.

EXAMPLE 18

The procedure of Example 17 was followed except 1% of PVOH/PVAm·HCl (3 mole % VAm·HCl) (60,000 M$_w$) Polymer C was added to the slurry (as a water solution) prior to the final 10,000 revolutions of the pulp disintegration stage. The test results are given in Table 5.

EXAMPLE 19

The procedure of Example 17 was followed except 50% of the Herty #3 pulp was replaced with ONP (old newsprint). The test results are given in Table 5.

EXAMPLE 20

The procedure of example 18 was followed except 50% of the Herty #3 pulp was replaced with ONP. The test results are given in Table 5.

TABLE 5

| Handsheet Date - Recycled Pulps/Virgin Pulp Mixtures | | | | |
|---|---|---|---|---|
| Example | 17 | 18 | 19 | 20 |
| Grammage, g/m$^2$ | 144.3 | 141.0 | 169.0 | 166.5 |
| Basis Wt., lb/ft$^2$ | 29.6 | 28.9 | 34.6 | 34.1 |
| Dry Tensile, lb/in | 44.3 | 58.3 | 42.4 | 45.3 |
| Dry Tensile, kN/m | 7.8 | 10.2 | 7.4 | 7.9 |
| Wet Tensile, lb/in | 1.5 | 5.9 | 1.5 | 5.5 |
| Wet Tensile, kN/m | 0.3 | 1.0 | 0.3 | 1.0 |
| Dry Tensile Index, Nm/g | 53.8 | 72.4 | 43.9 | 47.6 |
| Wet Tensile Index, Nm/g | 1.8 | 7.3 | 1.6 | 5.8 |
| Wet/Dry % | 3.4% | 10.1% | 3.5% | 12.1% |
| Breaking Length m | 5376 | 7243 | 4393 | 4765 |
| Polymer Additive | None | Polymer C | None | Polymer C |
| Alum (%) | 1.0% | 1.0% | 1.0% | 1.0% |
| Starch (%) | 0.3% | 0.3% | 0.3% | 0.3% |
| Paper Stock (% recycle) | 0% | 0% | 50% | 50% |
| Polymer Add-on | — | 1.0% | — | 1.0% |

EXAMPLE 21

The procedure of example 17 was followed except 0.5 wt. % of PVOH/VAm·HCl (6 mole % VAm·HCl) (130,000 M$_w$) (Polymer A) was added. The test results are given in Table 6.

EXAMPLE 22

The procedure of example 21 was followed except 50% of the Herty #3 pulp was replaced with ONP. The test results are given in Table 6.

EXAMPLE 23

The procedure of example 17 was followed except 0.5 wt. % of the PVOH/Vam·HCl (3 mole % VAm·HCl) (Polymer C) was added. The test results are given in Table 6.

EXAMPLE 24

The procedure of example 23 was followed except 50% of the Herty #3 pulp was replaced with ONP. The test results are given in Table 6.

EXAMPLE 25

The procedure in example 24 was followed except the polymer additive was 0.5% PVOH/ABAA (5 mole % ABAA) (Polymer D). The test results are given in Table 6.

EXAMPLE 26

The procedure in example 24 was followed except the polymer additive was 0.5% PVOH/VAm·HCl (12 mole % VAm·HCl) (Polymer E). The test results are given in Table 6.

TABLE 6

| Handsheet Data - Recycled Pulp/Virgin Pulp Mixtures | | | | | | |
|---|---|---|---|---|---|---|
| Example | 21 | 22 | 23 | 24 | 25 | 26 |
| Grammage, g/m$^2$ | 144.0 | 157.9 | 144.3 | 165.5 | 150.9 | 157.6 |
| Basis Wt., lb/ft$^2$ | 29.5 | 32.3 | 29.6 | 33.9 | 30.9 | 32.3 |
| Dry Tensile, lb/in | 56.5 | 43.7 | 54.6 | 40.7 | 38.6 | 37.0 |
| Dry Tensile, kN/m | 9.9 | 7.7 | 9.6 | 7.1 | 6.8 | 6.5 |
| Wet Tensile, lb/in | 5.3 | 4.1 | 4.6 | 3.8 | 2.1 | 3.3 |
| Wet Tensile, kN/m | 0.9 | 0.7 | 0.8 | 0.7 | 0.4 | 0.6 |
| Dry Tensile Index, Nm/g | 68.7 | 48.4 | 66.2 | 43.1 | 44.8 | 41.1 |
| Wet Tensile Index, Nm/g | 6.4 | 4.5 | 5.6 | 4.0 | 2.4 | 3.7 |
| Wet/Dry % | 9.4% | 9.4% | 8.4% | 9.3% | 5.4% | 8.9% |
| Breaking Length m | 6873 | 4845 | 6624 | 4377 | 4479 | 4112 |
| Polymer Additive | Polymer A | Polymer A | Polymer C | Polymer C | Polymer D | Polymer E |
| Alum (%) | 1.0% | 1.0% | 1.0% | 1.0% | 1.0% | 1.0% |
| Starch (%) | 0.3% | 0.3% | 0.3% | 0.3% | 0.3% | 0.3% |
| Paper Stock (% Recycle) | 0% | 50% | 0% | 50% | 50% | 50% |
| Polymer Add-on | 0.5% | 0.5% | 0.5% | 0.5% | 0.5% | 0.5% |

The experimental results clearly show the benefits gained from the addition of amine functional poly(vinyl alcohol) to the recycled paper based handsheets. No advantage is noted at higher amine levels (e.g. 12 mole %) for the vinyl alcohol/vinyl amine) copolymers versus lower levels (3 and 6 mole %).

We claim:

1. In a process for making recycled paper products, the improvement for increasing the wet and dry strength of the resultant recycled paper product which comprises adding to the wet-end of the papermaking process an amine functional poly(vinyl alcohol) formed by the reaction of poly(vinyl alcohol) with an aminoaldehyde dialkyl acetal where the poly(vinyl alcohol) is >75% hydrolyzed and the amine content is from >1 mole % to <15 mole % based on vinyl alcohol units, wherein said amine functional poly(vinyl alcohol) is added at a level of 0.1 to 4 wt. % based on dry paper weight.

2. The process of claim 1 where the recycled paper product comprises a mixture of recycled paper and virgin pulp.

3. The process of claim 1 where the amino aldehyde dialkyl acetal is 4-aminobutyraldehyde dimethyl acetal.

* * * * *